March 22, 1927.  
E. MAYER  
1,621,991  
DEVICE FOR DETERMINING PHOTOGRAPHIC EXPOSURES  
Filed Aug. 27, 1923
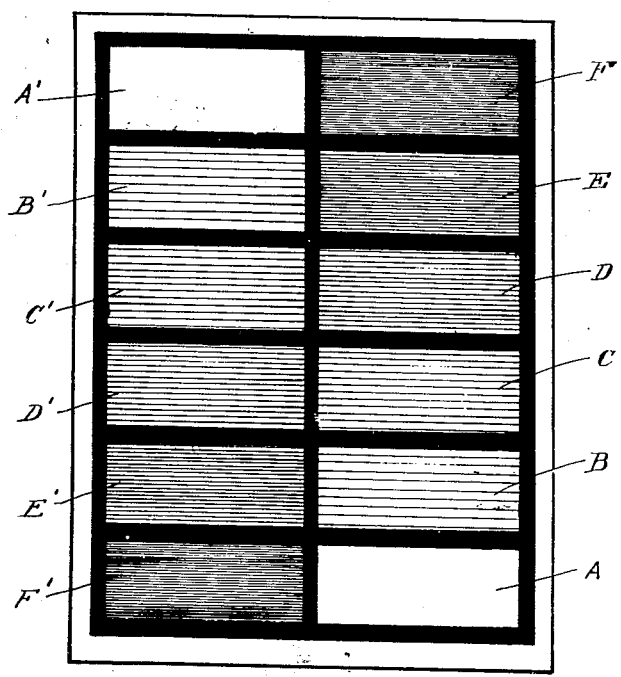

Patented Mar. 22, 1927.

1,621,991

UNITED STATES PATENT OFFICE.

EMIL MAYER, OF VIENNA, AUSTRIA.

DEVICE FOR DETERMINING PHOTOGRAPHIC EXPOSURES.

Application filed August 27, 1923, Serial No. 659,455, and in Austria May 30, 1923.

In photography the employment of sections or strips having different light-permeability from printing from negatives on development paper and chromated surfaces has been known for a long time. This is illustrated in U. S. patent to Brice, No. 182,099, dated September 12, 1876. The devices based on this principle, and which are usually called photographic testing plates, are utilized by having the light used for printing a proof or trial strip exposed through sections of different and gradually varying light-permeability. These sections form part of the testing plate, which is placed in front of the negative. The light-permeability of each section of the testing plate is previously determined and is known to the operator. The trial strip is then developed and the section thereof which appears to be the best is selected. Since the light-permeability of each section of the testing plate is known, this enables the operator to determine how and to what extent the time of exposure chosen for the trial strip should be modified for securing the best result when a print is made from the entire negative.

However, the results obtained with ordinary testing plates have been frequently unreliable and it has been difficult to use them, mainly for the following reasons:—

In order to secure any reliable results, it is necessary that the section of the negative which is considered as the test portion of the negative should correspond generally to the entire negative and should have suitable lines and contrasts. This cannot be predetermined with any degree of certainty, because it cannot be stated in advance which section will appear to be the correct or proper one. If, for example, the proper time of exposure is calculated with respect to a section of the negative which has no lines (as, for example, a section depicting sky and water) or if said section is dark and has deep shadows, it is impossible to determine from the test, the correct exposure test for the entire negative.

This disadvantage is obviated by employing a device made according to my invention, a preferred embodiment of which is shown in plan view in the accompanying drawing.

According to the invention two series of sections, each of which has gradually varying light-permeabilities, are arranged side by side upon the testing plate so that the most transparent section of one series is located at end of said series, and it is directly adjacent the darkest section of the other series.

If both series of sections be considered as having been placed originally side by side, with the most light-permeable or transparent sections adjacent each other, then the final relative arrangement of the said two series is the same as though one of them had been turned 180° while remaining in the same plane and had then been placed at the side of the other series.

By employing such a testing plate in the manner above set forth, the correct section of the negative which is to be utilized for the test can be determined with certainty, because equally transparent strips of the test plate receive the light corresponding to entirely different areas of the negative. In addition, the work of the operator is considerably facilitated because the effect of each strip of the testing plate has a counterpart at a different portion of the negative.

An additional disadvantage of previously known testing plates has resulted from the kind of graduation of the light-permeability of the strips.

Because of certain practical reasons, such strips of a testing plate can only be produced so that their light permeabilities vary in an arithmetical or geometrical progression or series having the factor 2. Hence the transparencies of the strips are as 2 to 4 to 6 to 8, etc., or 2 to 4 to 8 to 16, etc.

In a testing plate of the first type mentioned, the sections are far too numerous and differ too little one from the other. In addition, to properly determine the time of exposure, the length of a device of this type would be so great that it could not be conveniently used.

In the second type the differences between two successive sections are very large and cases will often arise in which the correct or proper exposure would correspond to a section whose transparency would have a value intermediate the transparency of two adjacent sections.

In a testing plate made according to the present invention, this disadvantage is obviated by causing the sections of the two series to vary in transparency in opposite directions, as previously described. By selecting the values of the respective transparencies of the successive sections of both series so that the transparencies of one series have the relative values of 2 to 4 to 8 to 16, etc., and said transparencies vary in the other series as 3 to 6 to 12 to 24, etc., a proper graduation of the sections is secured.

I claim:

A testing plate for photo-printing purposes and the like, embodying two substantially identical series of sections of varying transparency arranged side by side, the most transparent section of one of said series being adjacent the darkest section of the other series.

In testimony whereof I have signed my name to this specification.

DR. EMIL MAYER.